United States Patent
Hollenbach et al.

[11] Patent Number: 5,912,513
[45] Date of Patent: Jun. 15, 1999

[54] METHOD AND APPARATUS FOR REDUCING POWER DISSIPATION IN DC TERMINATION CIRCUIT

[75] Inventors: Keith E. Hollenbach, Reading; Donald R. Laturell, Allentown; Steven B. Witmer, Sinking Spring, all of Pa.

[73] Assignee: Lucent Technologies, Inc., Murray Hill, N.J.

[21] Appl. No.: 08/970,724

[22] Filed: Nov. 14, 1997

[51] Int. Cl.⁶ ........................................ H02J 1/04
[52] U.S. Cl. ..................... 307/44; 307/52; 379/378; 379/394; 379/398; 379/413
[58] Field of Search ................. 307/125, 43, 80, 307/52, 44, 64, 66; 379/442, 377, 378, 413, 398, 394

[56] References Cited

U.S. PATENT DOCUMENTS

| | | |
|---|---|---|
| 3,956,638 | 5/1976 | Ahrens et al. ........................... 307/44 |
| 4,318,007 | 3/1982 | Rizzi ........................................ 307/44 |
| 4,482,815 | 11/1984 | Orengo ................................... 307/44 |
| 5,502,634 | 3/1996 | Lavrisa ................................... 307/82 |
| 5,555,182 | 9/1996 | Galm ...................................... 307/80 |

*Primary Examiner*—Albert W. Paladini
*Attorney, Agent, or Firm*—Synnestvedt & Lechner

[57] ABSTRACT

A DC termination device particularly adapted for use in a device coupled to a two wire telecommunications system. The termination device controls the tip-to-ring current through the telecommunications device by means of a voltage controlled current source. The control voltage for the voltage controlled current source is provided by digital signal processing of the tip-to-ring voltage such that the tip-to-ring current is linearly proportional to the tip-to-ring voltage when the voltage is below a specified threshold level, but is maintained constant when the tip-to-ring voltage is over the threshold voltage. Preferably, the constant current is the minimum adequate current needed for operation.

38 Claims, 2 Drawing Sheets

METHOD AND APPARATUS FOR REDUCING POWER DISSIPATION IN DC TERMINATION CIRCUIT

FIELD OF THE INVENTION

This invention pertains to telephone line interface circuits. More particularly, the invention pertains to DC termination devices for limiting tip-to-ring current on a telephone line.

BACKGROUND OF THE INVENTION

In two-wire telephone communication systems, a pair of wires, termed tip and ring, respectively, carry a DC current which may be used for powering devices, such as telephones, coupled across the wires. Tip and ring also carry actual telephone signals, such as voice or modem signals. A voltage source at the central office of the telephone company provides a voltage across the tip and ring nodes so as to provide the aforementioned DC current. The wires connecting the telephone to the central office, of course, have a finite impedance. Accordingly, the length of wire between the central office and a particular telephone dictates the actual tip-to-ring voltage and current that the telephone receives. Thus, a telephone that is close to the central office (has a short distance of wire therebetween) normally will receive a higher voltage and therefore greater current than a telephone which is coupled to the central office through a longer wire connection.

Certain international standards, for example, international standard TBR 21 of the European Telecommunications Standard Institute (ETSI) require that the tip-to-ring current through any telecommunication device not exceed a specified current level. TBR 21, for instance, specifies a maximum tip-to-ring current of a telecommunications device of 60 milliamps. However, the standard also requires that, below 60 milliamps, the telecommunication device provides a constant impedance to the tip-to-ring line such that tip-to-ring current through the device will vary linearly with tip-to-ring voltage presented to the device.

Although many factors contribute to the establishment of such standards, one of the primary reasons for specifying a maximum tip-to-ring current is to reduce the power which the central office must generate in order to provide the DC tip-to-ring current to telecommunication devices coupled to the central office.

International standard TBR 21, as of the writing of this specification, has not been officially adopted, but is being highly recommended.

In view of international standard TBR 21 and other standards containing tip-to-ring current limit specifications, telecommunication equipment must be provided with front end DC termination circuitry for limiting tip-to-ring current through the device. Such circuitry usually takes the form of a current limit circuit that provides a constant resistance up to the specified current limit and thereafter provides a constant current at the specified current limit as the voltage continues to rise. For example, from 0 to 60 milliamps, tip-to-ring current through the device increases linearly with tip-to-ring voltage. However, when the current reaches 60 milliamps, the current will remain constant at 60 milliamps as the tip-to-ring voltage increases further.

Telecommunication devices commonly employ a current sink that may dissipate excess power when the tip-to-ring currents are high. Such current sinks may require a heat spreader or some other means of dissipating the heat buildup in the active components (commonly termed a heat sink) in order to avoid heat damage to the current sink. Heat sinks consume a significant amount of volume. Many telecommunication devices, for example, PCMCIA card modems are extremely small. Thus, the need for large heat sinks is a significant problem since it will reduce the space available for other desirable electronic componentry.

A tip-to-ring voltage of 60 volts, for example, would not be unusual in most countries. Accordingly, with a tip-to-ring voltage of 60 volts and a tip-to-ring current of 60 milliamps, up to 3.6 watts of power will be dissipated in the telecommunications device. 3.6 watts is a significant amount of power to dissipate, thus requiring a fairly large heat sink. In a compact piece of equipment in which various electronic circuits are closely packed together, the heat put out by the heat sink might adversely affect the operation of, or even destroy, neighboring electronic circuitry.

Accordingly, it is an object of the present invention to provide an improved DC termination device.

It is another object of the present invention to provide a DC termination device which can meet the performance requirements of various standards.

It is a further object of the present invention to provide an improved DC termination device for a telecommunications device which can meet the specifications of various standards and minimize power dissipation in the device.

SUMMARY OF THE INVENTION

The invention is a method and apparatus using digital signal processing for limiting tip-to-ring current through a telecommunications device responsive to tip-to-ring voltage. In particular, the invention is a DC termination device comprising a voltage controlled current source coupled across the tip-to-ring lines and controlled by the local digital signal processor responsive to the detected tip-to-ring voltage on the line. The tip-to-ring signals, include the DC tip-to-ring current, and AC currents which comprise the audio band transmit and receive signals. The tip-to-ring signal is amplified and converted by an analog to digital converter. The AC and DC components of the tip-to-ring signal are digitally filtered and applied to digital signal processing circuitry. The DC component of the signal is digitally filtered and forwarded to digital signal processing circuitry that determines the DC tip-to-ring voltage. When the digital detection circuitry detects a tip-to-ring voltage that would produce a current of less than the specified maximum current, the digital signal processor adjusts the tip-to-ring voltage via the voltage control inputs of the voltage controlled current source to cause it to operate essentially as a constant impedance, thus providing a linear relationship between tip-to-ring voltage and tip-to-ring current through the device. This mode is termed the constant impedance mode.

However, when the DC tip-to-ring voltage crosses the designated threshold, indicating that the tip-to-ring current will exceed 60 milliamps, the circuitry enters a constant current mode. In this mode, the digital signal processor generates a control signal for the voltage controlled current source to cause it to maintain the tip-to-ring current at a specified current value regardless of the detected tip-to-ring voltage. The signal is provided to the voltage controlled current source, through appropriate conditioning, amplification and digital to analog converting circuitry.

The constant current provided in the constant current mode need not be the maximum threshold current, but can be any arbitrarily selected current. Accordingly, in a preferred embodiment of the invention, rather than causing the maximum threshold current to be the constant current, the constant current is set at or near the minimum operational current in order to minimize power dissipation in the device. In such an embodiment, when the device switches to the constant current mode, the drop in tip-to-ring current will be accompanied by an increase in tip-to-ring voltage. Thus, when in the constant current mode, and the voltage drops below a second voltage threshold indicative of the fact the voltage provided by the central office would produce a current of less than 60 milliamps if in the constant impedance mode, the digital processing circuitry switches back to the constant impedance mode.

DETAILED DESCRIPTION OF THE INVENTION

Figure 1:
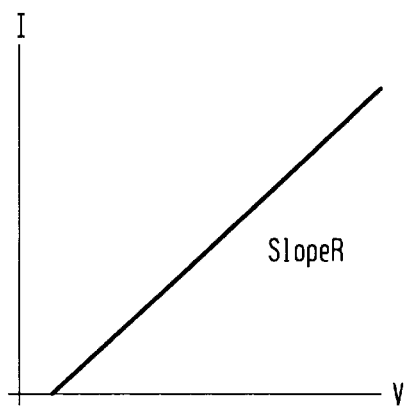
FIG. 1 is a graph illustrating an exemplary tip-to-ring current versus tip-to-ring voltage relationship for a telecommunications device of the prior art containing no current control circuitry.

FIG. 1 is a graph illustrating an exemplary tip-to-ring current versus tip-to-ring voltage relationship for a telecommunications device of the prior art containing no current control circuitry. Without any particular current control circuitry, the telecommunication device presents essentially a constant impedance to the circuit. Accordingly, the tip-to-ring current to tip-to-ring voltage relationship is a straight line of slope I, as illustrated in FIG. 1. Thus, a telecommunication device of this design which is coupled close to a central office, and therefore, receives a higher tip-to-ring voltage, will draw more current than a device positioned further away.

Figure 2:
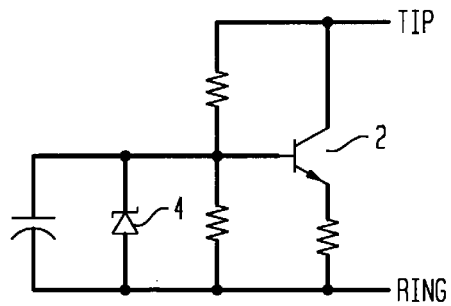
FIG. 2 is a schematic diagram of a DC termination device of the prior art.

At least in part due to this, standards have been promulgated which require that telecommunication devices contain a DC termination circuit for preventing the device from drawing current from the tip-to-ring lines exceeding a specified threshold value. One prior art solution to providing this characteristic is a current sink circuit with a corresponding heat sink. An example of such a circuit is shown in FIG. 2. It comprises a transistor 2 having its source to drain terminals coupled across tip and ring and a Zener diode 4 coupled between ring and the base of the transistor in order to prevent the current from tip-to-ring from exceeding a threshold level specified by the value of the Zener diode 4.

Figure 3:
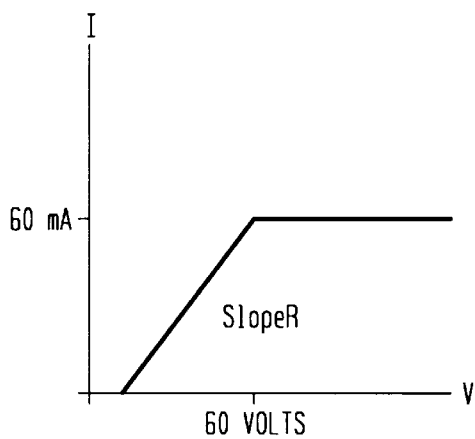
FIG. 3 is a graph illustrating an exemplary tip-to-ring current versus tip-to-ring voltage relationship for a telecommunications device having a typical tip-to-ring current control device of the prior art.

The characteristics of a telecommunication device containing such a current control DC termination device would be as shown in FIG. 3. As can be seen, the device will have a constant impedance characteristic below the specified threshold current. However, above the specified threshold current, further increases in the tip-to-ring voltage will not affect the tip-to-ring current, which will remain at the threshold current. In this device, even though the threshold current is not exceeded, there is still significant power dissipation when the tip-to-ring voltage is high because the tip-to-ring current is maintained at the absolute maximum threshold current value.

Figure 4:
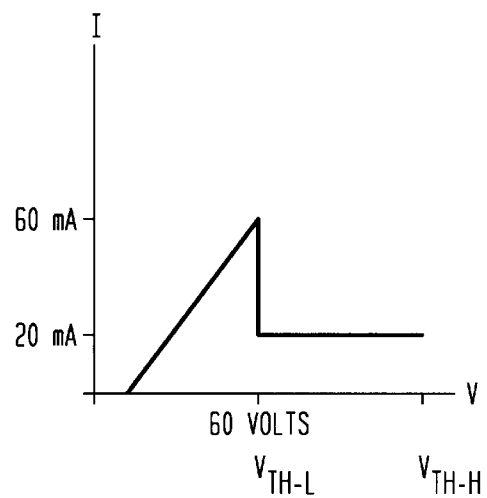
FIG. 4 is a graph illustrating an exemplary tip-to-ring current versus tip-to-ring voltage relationship for a telecommunications device constructed in accordance with the present invention.

FIG. 4 illustrates a desirable tip-to-ring current to tip-to-ring voltage relationship for a two-wire telecommunications device. As can be seen from FIG. 4, the desired characteristics are that the telecommunications device presents a constant impedance to the line when the tip-to-ring voltage is below a specified threshold $V_{TH-L}$. When the tip-to-ring voltage exceeds $V_{TH-L}$, the telecommunications device presents a variable impedance to the line such that, above $V_{TH-L}$, the tip-to-ring current remains constant for any value of tip-to-ring voltage. In this manner, the tip-to-ring current is guaranteed never to exceed a specified current dictated by the selected value of $V_{TH-L}$. The constant current may be set to the current $I_{TH-L}$. However, preferably, in order to minimize power dissipation, the constant current level is maintained at or near the minimum current needed to assure proper operation of the telecommunications device on the line or the minimum current allowed by any applicable performance specifications, whichever is higher. It will be apparent to those of skill in this art that, in the latter embodiment, since V=IR (voltage is equal to current times resistance), when the apparent line resistance decreases as the tip-to-ring voltage increases from just below $V_{TH-L}$ to just above $V_{TH-L}$, the tip-to-ring voltage will increase discontinuously. This is because the relationship V=IR holds under all circumstances. Thus, when the tip-to-ring voltage exceeds $V_{TH-L}$ and the telecommunications device enters the constant current mode, the tip-to-ring voltage will jump to a value higher than $V_{TH-H}$. The exact value of $V_{TH-H}$ is a function of $V_{TH-L}$ and the newly chosen lower operating current. More generally, the tip-to-ring voltage to current relationship changes as the device switches from a constant impedance mode to the constant current mode. Accordingly, when the device is in the constant current mode, $V_{TH-L}$ is no longer the voltage indicative of when the tip-to-ring current would be below $I_{TH}$ if the device were in the constant impedance mode. Rather, a much higher tip-to-ring voltage, $V_{TH-H}$, will signify that, if operation is reverted back to the constant impedance mode, the tip-to-ring current would be below $I_{TH}$.

Due to the increasing miniaturization of electronic components, including componentry both in and separate from integrated circuit packages as well as the increasingly more common employment of digital signal processing technology in telecommunications devices, it is now possible to provide substantial additional functionality with minimal increase in cost or circuitry by simply adding functionality in the digital signal processor. Particularly, since a digital signal processor is embodied in the apparatus and typically is so fast as to be able to perform substantially more processing in a given time period than is needed for basic operation, the digital signal processor can be programmed to perform many functions which previously were performed by separate circuitry.

The present invention takes advantage of the existence of digital signal processing in the device to provide the current to voltage relationship illustrated in FIG. 4.

Figure 5:
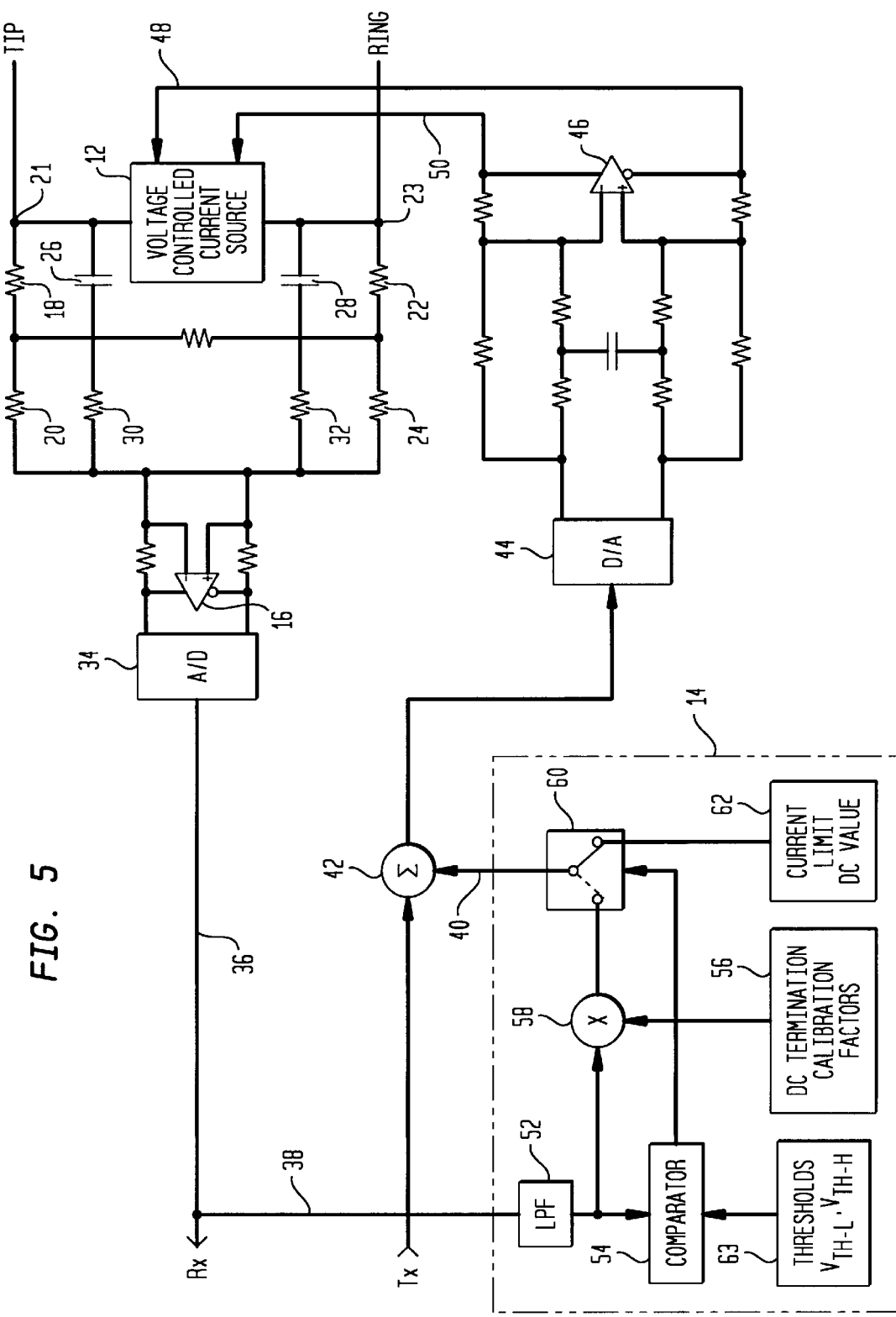
FIG. 5 is a block diagram illustrating a DC termination device constructed in accordance with the present invention.

FIG. 5 is a functional block diagram of the pertinent circuitry for a two-line telecommunications device in accordance with the present invention. In order not to obfuscate the invention, FIG. 5 shows only the circuitry relevant to the DC termination circuitry for controlling the tip-to-ring current across the device. However, it should be understood that, although not shown in the figure, the device typically contains circuitry which is actually powered by the DC tip-to-ring voltage available across nodes 21 and 23.

The functionality of the present invention is embodied primarily in voltage controlled current source (VCCS) block 12 and control block 14. It should be understood that, while the block diagram of FIG. 5 illustrates the functionality of the circuit in terms of specifically identified circuit components or blocks, preferably the functionality illustrated within control block 14 is provided by a programmed DSP and not necessarily by distinct circuit components. On the other hand, of course, the invention can be implemented by distinct circuit components.

In any event, the tip and ring terminals are coupled to the device at nodes 21 and 23. VCCS 12 is coupled across nodes 21 and 23. The tip-to-ring current may include any one or more of (1) the DC tip-to-ring current, (2) an AC feedback current, (3) a DC feedback current, and (4) an AC audio band signal comprising the actual data being transmitted and/or received. The tip and ring lines are coupled to the infinite impedance (theoretically) of the complementary input terminals of a differential amplifier 16, as well as to the VCCS 12. The DC signal path to the differential amplifier is through resistors 18, 20, 22 and 24. The AC signal path to the differential amplifier is through capacitors 26 and 28 and resistors 30 and 32. The amplified signal is provided to an analog to digital converter 34. The output 36 of the A/D converter 34 is provided to a digital signal processor for extraction and processing of the receive audio band data signal, the DC feedback signal, and the AC control signal. The digital signal on line 36 is thus indicative of the DC tip-to-ring voltage. Accordingly, the signal on line 36 also is provided through signal path 38 to control circuitry 14. Control circuitry 14 includes circuitry for determining the tip-to-ring DC line voltage and generating a control voltage output on line 40 which will be used to control VCCS 12.

Control circuit 14 comprises a digital low pass filter 52, a digital comparator 54, a DC termination calibration factor 56, a multiplier 58, a switch 60, a voltage source circuit 63 for generating the threshold voltages, and two voltage sources 62 and 63. In operation, the digital signal is applied to a low pass filter 52 to extract from the signal on line 38 only the DC tip-to-ring voltage component. The output of the filter 52 is applied to the comparator 54 and to a multiplier 58.

Comparator 54 compares the DC tip-to-ring voltage to the pre-determined values $V_{TH-L}$ or $V_{TH-H}$ supplied by voltage generator 63. Voltage generator 63 selects the value to be applied to the comparator, i.e., $V_{TH-L}$ or $V_{TH-H}$ responsive to the mode in which the termination device is currently operating. Specifically, when in the constant impedance mode, voltage generator 63 applies $V_{TH-L}$ to the comparator 54 for comparison with the tip-to-ring voltage. When in the constant current mode, voltage generator 63 applies $V_{TH-H}$ to the comparator 54 for comparison with the tip-to-ring voltage. The output of the comparator 54 controls a switch 60 which switches the control circuit 14 between the two modes of operation, namely, constant impedance mode and constant current mode. Particularly, when control circuit 14 is in the constant impedance mode and comparator 54 detects that the tip-to-ring voltage has crossed from a value below $V_{TH-L}$ to a value above $V_{TH-L}$, it controls switch 60 to switch from the constant impedance mode (the mode shown in solid in FIG. 5) to the constant current mode (the mode shown it dotted outline in FIG. 5).

When control circuit 14 is in the constant current mode and comparator 54 detects that the tip-to-ring voltage has crossed from above $V_{TH-H}$ to below $V_{TH-H}$, it causes switch 60 to switch back to the constant impedance mode.

As can be seen from FIG. 5, when control circuit 14 is in the constant impedance mode, the tip-to-ring DC voltage received from the line is filtered by low pass filter 54 and applied to multiplier circuit 58 where it is multiplied with an appropriate DC termination calibration factor from DC calibration factor circuit 56. The DC termination calibration factors generated by circuit 56 are merely appropriate scaling factors to cause the voltage on line 40 (and thus on control lines 48 and 50) to be an appropriate value. The output of the multiplier 58 is applied through the switch 60 to control DC control voltage output line 40 for transmission to the voltage control lines 48 and 50 of VCCS as described more fully below. Thus, in constant impedance mode, the control voltage for VCCS 12 that is placed on control voltage line 40 for transmission to the control voltage terminals of the VCCS 12 is simply a conditioned and properly proportioned version of the tip-to-ring voltage received over the line. This will cause the current-to-voltage relationship to behave as illustrated in FIG. 4 for values of tip-to-ring voltage below $V_{TH-L}$.

When control circuit 14 is in the constant current mode (shown in solid outline in FIG. 5), a constant DC voltage is applied to line 40 through switch 60. Accordingly, the DC control voltage applied to line 40 for controlling VCCS 12 will be constant. This, in turn, will cause the voltage controlled current source to allow a fixed and unvarying current to pass through the VCCS from node 21 to node 23. Thus, the tip-to-ring current through voltage controlled current source 12 is maintained constant when the tip-to-ring voltage is above $V_{TH-H}$.

The VCCS control voltage on line 40 is first summed by summing circuit 42 with the audio band transmit signal which is received from the audio digital signal processing circuitry. The audio digital signal processing circuitry, of course, may actually be comprised of the same digital signal processor that generates the control voltage on line 40. The output of the summing circuit is provided to a digital to analog converter 44 for conversion to analog form. It is then amplified by differential amplifier 46 and applied to VCCS 12 via lines 48 and 50. Within VCCS 12, the DC control voltage is extracted by appropriate filtering and applied to the voltage control terminals where it controls the tip-to-ring current through the VCCS (from node 21 to node 23). The AC audio component of the signal on lines 48 and 50 is applied directly to the tip-to-ring nodes 21 and 23 for transmission back to the central office.

The DC termination calibration factor circuitry 56 and the voltage source 62 can be designed to provide almost any current-to-voltage relationship desirable. The relationship illustrated in FIG. 4 and described herein is merely one preferred example. Also, the invention has been described with respect to a two-wire telecommunications device designed to perform in accordance with ETSI standard TBR 21. However, it should be understood that the device can be used in many other telecommunication applications as well as non-telecommunication applications. The device can be used as the front end for any device which should have a desired current-to-voltage relationship.

Even further, the circuitry illustrated in control block 14 may be comprised of individual circuits, may simply be part of the functionality of a programmable digital signal processor, or even may be part of the functionality of a digital signal processor existing in the circuit for additional reasons, such as processing of the audio band data signals. Even further, the functionality shown in block 14 may be provided by a finite state machine.

Figure 6:
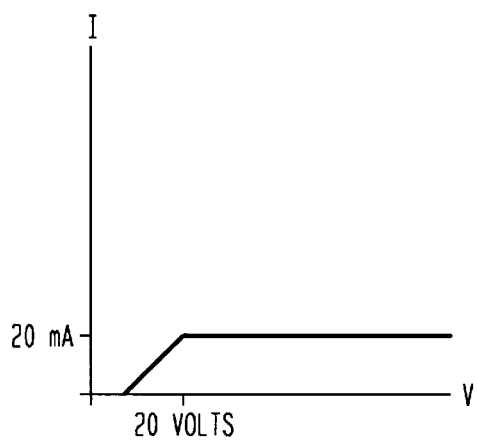
FIG. 6 is a graph illustrating an alternate exemplary tip-to-ring current versus tip-to-ring voltage relationship for a telecommunications device constructed in accordance with the present invention.

In certain applications, it may be desirable to enter the constant current mode whenever the tip-to-ring voltage indicates that the tip-to-ring current would exceed the minimum current necessary to assure reliable operation of the device. Such operation would keep power consumption in the device to a minimum. FIG. 6 is a graph illustrating such a current-to-voltage relationship. However, many of the standards, such as the ETSI international standard TBR 21, have certain performance requirements which require a current-to-voltage relationship as illustrated in FIG. 4 which would not be met by a current-to-voltage relationship as illustrated in FIG. 6.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

What is claimed is:

1. A telecommunication device comprising:
   a DC termination circuit for controlling a current through said telecommunication device as a function of a DC voltage supplied to said telecommunication device as at least a portion of a telecommunication signal received over a telecommunication network, said DC termination circuit comprising:
   a voltage controlled current source coupled across said DC voltage supplied to said telecommunications device having a control input;
   means for determining said DC voltage supplied to said electrical circuit by said voltage source; and
   means, coupled between said means for determining and said control input of said voltage controlled current source, for supplying a control voltage for controlling said voltage controlled current source as a function of said determined voltage.

2. An apparatus as set forth in claim 1 wherein said means for determining voltage comprises a digital signal processor programmed to compare said voltage with first and second reference threshold voltages, said second reference threshold voltage being above said first reference threshold voltage.

3. An apparatus as set forth in claim 2 wherein said means for supplying comprises a digital signal processor programmed to supply a control signal in a first state when said DC voltage is below said first threshold voltage, to supply said control signal in a second state when said DC voltage crosses from below to above said first reference threshold voltage, and to generate said control signal in said first state when said DC voltage crosses from above to below said second reference threshold voltage.

4. An apparatus as set forth in claim 3 wherein said control signal in said first state is a function of said DC voltage and said control signal in said second state is a fixed voltage.

5. An apparatus as set forth in claim 4 wherein said control signal in said first state is a function of said DC voltage and said control signal in said second state is a fixed voltage, whereby, in said first state, said electrical circuit presents a constant impedance to said voltage source and, in said second state, said electrical circuit drains a constant current from said voltage source.

6. An apparatus as set forth in claim 1 wherein said means for determining voltage comprises a comparator coupled to compare said voltage with first and second reference threshold voltages, said second reference threshold voltage being above said first reference threshold voltage, and to generate a control signal in a first state when said DC voltage is below said first reference threshold voltage, in a second state when said DC voltage crosses from below to above said first reference threshold voltage, and in said first state when said DC voltage crosses from above to below said second reference threshold voltage.

7. An apparatus as set forth in claim 6 wherein said means for supplying comprises a switch coupled to said voltage controlled current source and to said comparator to supply a variable voltage to said voltage controlled current source responsive to said control signal being in said first state and to supply a fixed voltage to said voltage controlled current source responsive to said control signal being in said second state.

8. An apparatus as set forth in claim 7 wherein said variable voltage is a function of said DC voltage and wherein said electrical circuit presents a constant impedance to said voltage source when said control signal is in said first state and said electrical circuit drains a constant current from said voltage source when said control voltage is in said second state.

9. An apparatus as set forth in claim 8 wherein said constant current is about the minimum current required to operate said electrical circuit.

10. A DC termination apparatus for controlling a current through a telecommunication device as a function of a DC voltage supplied to said telecommunication device as at least a portion of a telecommunication signal received over a telecommunication network, said apparatus comprising:
    a voltage controlled current source coupled across said telecommunication network;
    a voltage comparator coupled to receive said DC voltage for comparing said DC voltage to at least a first reference threshold voltage and for generating a control signal in a first state when said DC voltage is below said first reference threshold voltage and in a second state when said DC voltage is above said first reference threshold voltage;
    a constant voltage source;
    a switch having an output terminal coupled to said control input terminal of said voltage controlled current source, a first input terminal coupled to said constant voltage source and a second input terminal coupled to a variable voltage signal; and
    wherein said switch, responsive to said control signal being in said first state, couples said first input terminal to said output terminal, and, responsive to said control signal being in said second state, couples said second input terminal to said output terminal.

11. An apparatus as set forth in claim 10 wherein said voltage comparator further compares said DC voltage to a second reference threshold voltage higher than said first reference threshold voltage and further generates said control signal in said first state when said DC voltage crosses from above to below said second reference threshold voltage.

12. An apparatus as set forth in claim 11 wherein said signal further comprises telecommunication data and said signal is further coupled to a digital signal processor for processing of said telecommunication data and wherein said digital signal processor comprises said voltage comparator and said switch.

13. An apparatus as set forth in claim 12 wherein said digital signal processor further comprises said voltage controlled current source.

14. An apparatus as set forth in claim 11 wherein said variable voltage source is a function of said DC voltage, whereby, when said switch is in said first state, said telecommunication device presents a constant impedance to said telecommunication network and, when said switch is in said second state, said telecommunication device sinks a constant current from said telecommunication network.

15. An apparatus as set forth in claim 14 wherein said constant current is about the minimum current required to operate said telecommunication device.

16. An apparatus as set forth in claim 15 further comprising:
   an analog to digital converter coupled to said telecommunication network to receive said telecommunication signal for converting said signal to digital form;
   a lowpass filter coupled to said analog to digital converter to extract said DC voltage from said telecommunication signal; and
   wherein said output of said lowpass filter is coupled to said voltage comparator and said switch.

17. An apparatus as set forth in claim 16 further comprising a digital to analog converter coupled between said output terminal of said switch and said voltage controlled current source.

18. An apparatus as set forth in claim 17 wherein said signal further comprises telecommunication data and said signal is further coupled to a digital signal processor for processing of said telecommunication data and wherein said digital signal processor comprises said voltage comparator, said switch, said analog to digital converter, and said digital to analog converter.

19. An apparatus as set forth in claim 17 further comprising a calibration circuit for generating a calibration factor for conditioning said DC voltage for controlling said voltage controlled current source when said switch is in said first state and a multiplier coupled between said lowpass filter and said switch for multiplying said DC voltage with said DC calibration factor.

20. An apparatus as set forth in claim 19 further comprising a calibration circuit for generating a calibration factor for conditioning said DC voltage for controlling said voltage controlled current source when said switch is in said first state and a multiplier coupled between said lowpass filter and said switch for multiplying said DC voltage with said DC calibration factor and wherein said calibration circuit is comprised of said digital signal processor.

21. A method of controlling the current through an electrical device as a function of a voltage supplied to said device comprising:
   providing a voltage controlled current source to control the current through said device;
   determining said voltage supplied to said device;
   when said voltage supplied to said device is below a first predetermined value, controlling said voltage controlled current source to present a constant impedance to said voltage source;
   when said voltage supplied to said device crosses from below to above said first predetermined value, controlling said voltage controlled current source to drain a constant current from said voltage source; and
   when said voltage supplied to said device crosses from above to below a second predetermined value, controlling said voltage controlled current source to present a constant impedance to said voltage source.

22. A method as set forth in claim 21 wherein said constant current is about the minimum current necessary to operate said device.

23. A method as set forth in claim 22 wherein said determining step comprises comparing said voltage with first and second reference threshold voltages, said second reference threshold voltage being above said first reference threshold voltage.

24. A method as set forth in claim 23 wherein said controlling step comprises supplying a control signal to said voltage controlled current source in a first state when said voltage is below said first predetermined value, supplying said control signal in a second state when said voltage crosses from below to above said first predetermined value, and supplying said control signal in said first state when said voltage crosses from above to below said second predetermined value.

25. An apparatus as set forth in claim 24 wherein said control signal in said first state is a function of said voltage and said control signal in said second state is a fixed value.

26. A method of controlling the current through an electrical device as a function of a voltage supplied to said device comprising:
   determining said voltage supplied to said device;
   when said voltage supplied to said device is below a first predetermined value, controlling said device to present a constant impedance to said voltage source;
   when said voltage supplied to said device crosses from below to above said first predetermined value, controlling said device to drain a constant current from said voltage source, said constant current being less than a current that would be drained from said voltage source if said supplied voltage is at said predetermined value and said device presented a constant impedance to said voltage source; and
   when said voltage supplied to said device crosses from above to below a second predetermined value, controlling said device to present a constant impedance to said voltage source.

27. A method as set forth in claim 26 wherein said constant current is about the minimum current necessary to operate said device.

28. A method as set forth in claim 27 wherein said constant impedance is a function of said supplied voltage.

29. A method as set forth in claim 28 wherein said constant impedance is directly proportional to said supplied voltage.

30. A DC termination apparatus for controlling a current through a telecommunication device as a function of a DC voltage supplied to said telecommunication device as at least a portion of a telecommunication signal received over a telecommunication network, said apparatus comprising:
   a voltage controlled current source coupled across said telecommunication network and having a control input;
   means for determining said DC voltage supplied to said telecommunication device by said telecommunication network;
   means, coupled between said means for determining and said control input of said voltage controlled current source, for supplying a control voltage for controlling said voltage controlled current source as a function of said determined voltage.

31. An apparatus as set forth in claim 30 wherein said means for determining voltage comprises a digital signal processor programmed to compare said voltage with first and second reference threshold voltages, said second reference threshold voltage being above said first reference threshold voltage.

32. An apparatus as set forth in claim 31 wherein said means for supplying comprises a digital signal processor programmed to supply a control signal in a first state when said DC voltage is below said first threshold voltage, to supply said control signal in a second state when said DC voltage crosses from below to above said first reference threshold voltage, and to generate said control signal in said first state when said DC voltage crosses from above to below said second reference threshold voltage.

33. An apparatus as set forth in claim 32 wherein said control signal in said first state is a function of said DC voltage and said control signal in said second state is a fixed voltage.

34. An apparatus as set forth in claim 33 wherein said control signal in said first state is a function of said DC voltage and said control signal in said second state is a fixed voltage, whereby, in said first state, said telecommunication device presents a constant impedance to said telecommunication network and, in said second state, said telecommunication device drains a constant current from said telecommunication network.

35. An apparatus as set forth in claim 30 wherein said means for determining voltage comprises a comparator coupled to compare said voltage with first and second reference threshold voltages, said second reference threshold voltage being above said first reference threshold voltage, and to generate a control signal in a first state when said DC voltage is below said first reference threshold voltage, in a second state when said DC voltage crosses from below to above said first reference threshold voltage, and in said first state when said DC voltage crosses from above to below said second reference threshold voltage.

36. An apparatus as set forth in claim 35 wherein said means for supplying comprises a switch coupled to said voltage controlled current source and to said comparator to supply a variable voltage to said voltage controlled current source responsive to said control signal being in said first state and to supply a fixed voltage to said voltage controlled current source responsive to said control signal being in said second state.

37. An apparatus as set forth in claim 36 wherein said variable voltage is a function of said DC voltage and wherein said telecommunication device presents a constant impedance to said telecommunication network when said control signal is in said first state and said telecommunication device drains a constant current from said telecommunication network when said control voltage is in said second state.

38. An apparatus as set forth in claim 37 wherein said constant current is about the minimum current required to operate said telecommunication device.

* * * * *